United States Patent [19]
Marinkovic

[11] Patent Number: 6,047,958
[45] Date of Patent: Apr. 11, 2000

[54] ADJUSTABLE PALLET

[75] Inventor: Sinisa V. Marinkovic, Skokie, Ill.

[73] Assignee: Active Automation, Inc., Elk Grove Village, Ill.

[21] Appl. No.: 09/345,687

[22] Filed: Jun. 30, 1999

[51] Int. Cl.[7] ........................................... B25B 1/20
[52] U.S. Cl. ................................. 269/43; 269/44
[58] Field of Search ................... 269/43, 44, 45, 269/139, 218, 242, 243, 156, 289 R

[56] References Cited

U.S. PATENT DOCUMENTS

| | | |
|---|---|---|
| 4,557,371 | 12/1985 | Yonezawa . |
| 5,201,502 | 4/1993 | Schneider . |
| 5,363,563 | 11/1994 | Hunter . |
| 5,391,230 | 2/1995 | Pastecki et al. ........................... 269/43 |

*Primary Examiner*—Timothy V. Eley
*Assistant Examiner*—Benjamin M. Halpern
*Attorney, Agent, or Firm*—Olson & Hierl Ltd.

[57] ABSTRACT

An adjustable pallet for securing a plurality of elongated workpieces to the work-table of a machine tool. The pallet comprises a rectangular, substantially planar base having three horizontally-disposed plates attached thereto. Each of the three plates has an array of apertures therethrough arranged in a predetermined grid pattern. The grid patterns on the three plates correspond to one another. The middle of the three plates is adjustably slidable with regard to the top and bottom plates, which are fixedly attached to one another. The top and bottom plates are attached to one another with their respective apertures in registry or alignment. The pallet utilizes thumb-nut assemblies to threadedly adjust the displacement of the middle plate with regard to the top and bottom plates. The middle plate is adjustably movable to a position that allows the apertures therein to be in registry or alignment with those of the top and bottom plates. When the apertures of the three plates are in registry, an elongated workpiece can be inserted into one or more of the through opening formed by the aligned apertures. With the workpieces inserted into the desired through openings, the operator can rotate the thumb-nut assemblies to move the middle plate and the apertures therein out of alignment with the apertures in the top and bottom plates. The displacement of the middle plate against each workpiece thus secures each workpiece within the pallet.

9 Claims, 3 Drawing Sheets

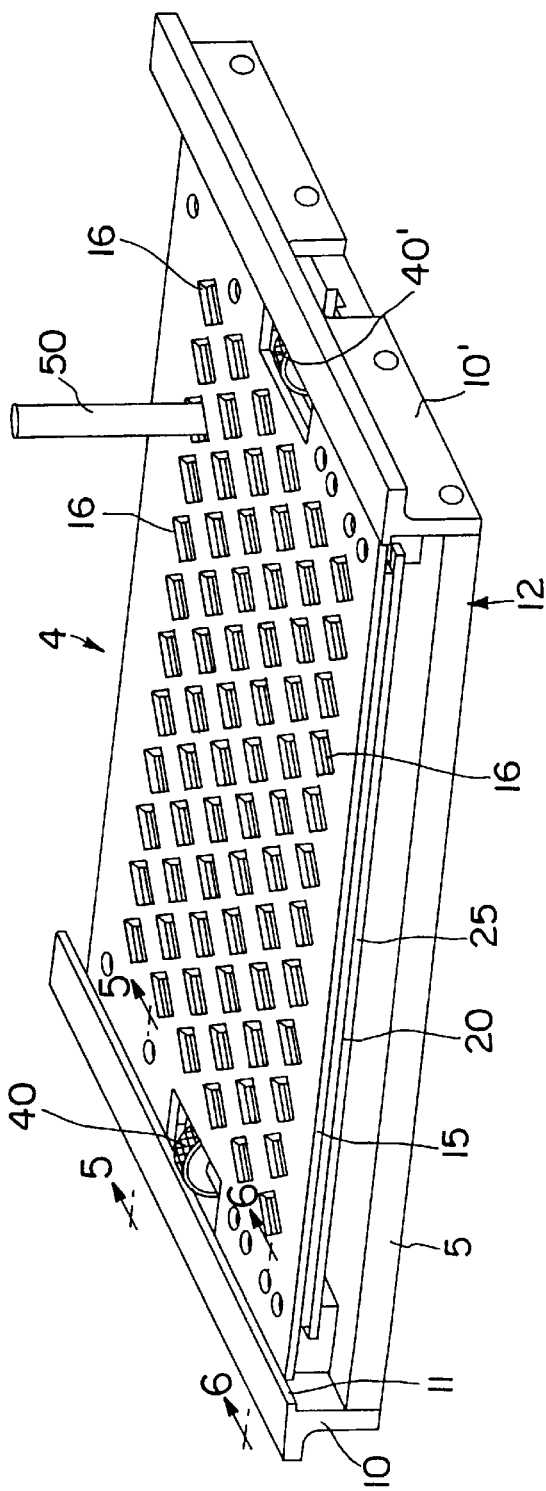
FIG. 1
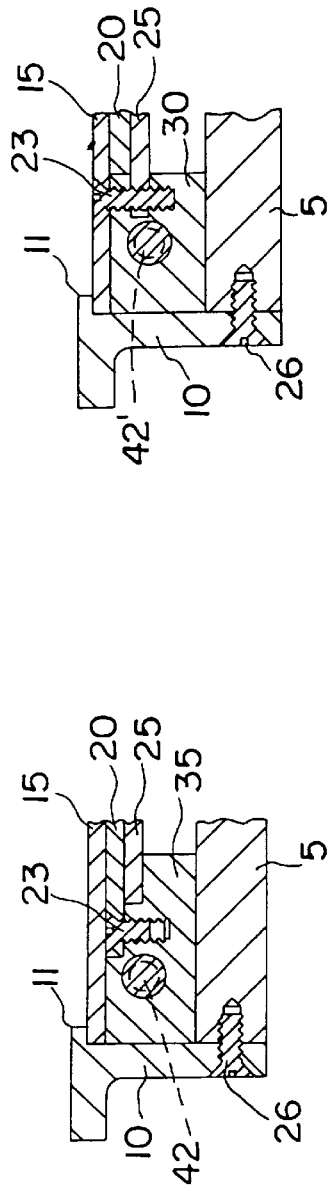
FIG. 6
FIG. 5

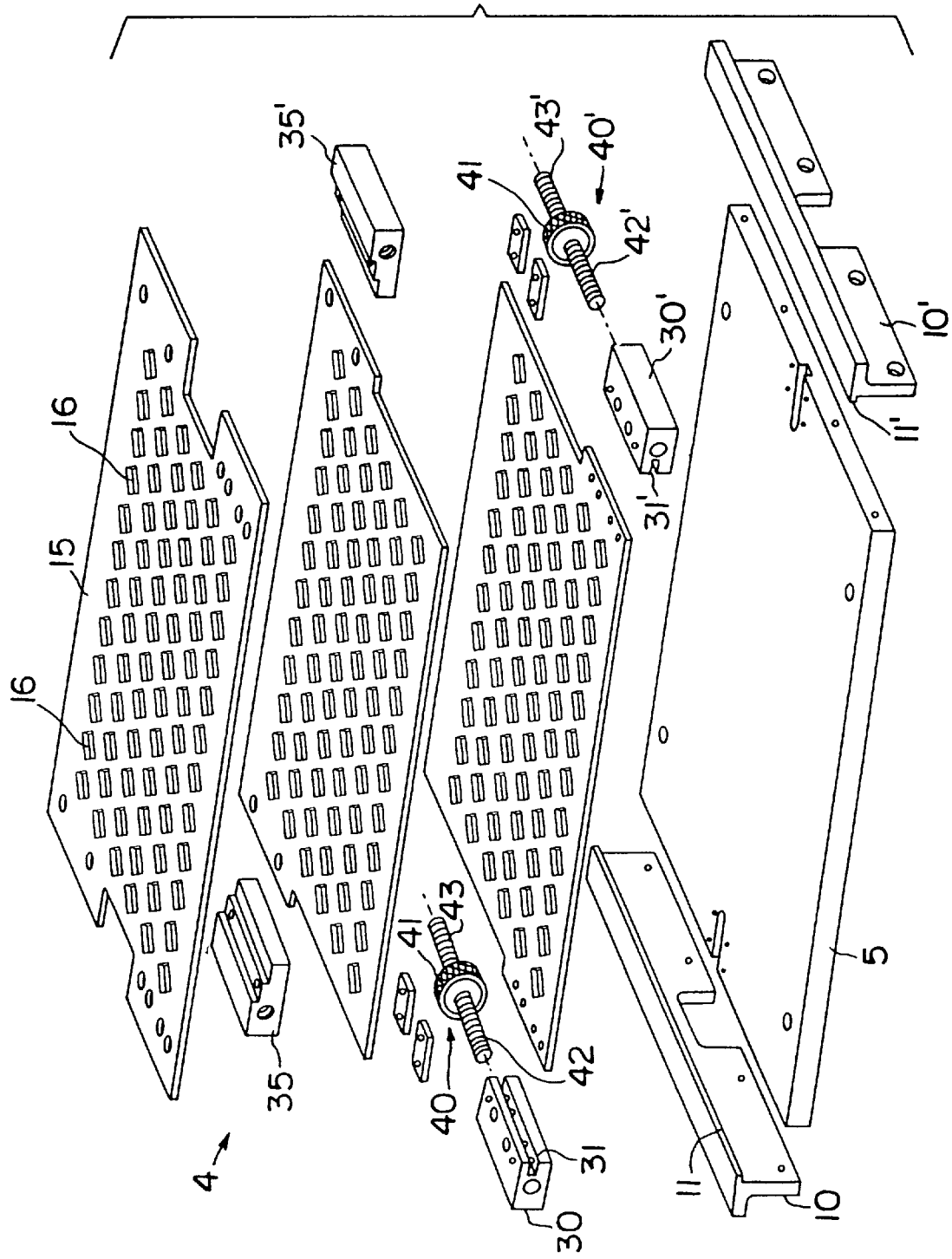

ADJUSTABLE PALLET

TECHNICAL FIELD OF THE INVENTION

This invention relates to an apparatus for securing workpieces to be machined by a machine tool, such as a grinder; specifically, for securing a plurality of elongated workpieces using minimal fastening methods.

BACKGROUND OF THE INVENTION

During a machining process, the subject workpiece must be affixed proximal to the machine tool to ensure that the workpiece remains in a desired position when acted on by the machine tool. Typically, workpieces are affixed to a worktable that is part of the machine tool itself.

Various types of apparatus for affixing such workpieces have been proposed and constructed in the past. One common method for securing workpieces to a worktable includes the use of T-head bolts that are used in conjunction with T-shaped grooves located within the worktable.

With this method, a worktable typically has inverted T-shaped grooves beneath the worktable surface that accept an insertion therein of an inverted T-shaped head of a T-head bolt. The threaded shaft of the bolt protrudes from the surface of the worktable from within the groove to accept the placement thereon of a threaded nut.

When the nut is threaded onto the shaft of the bolt, it is tightened against the worktable surface, causing the T-shaped head of the bolt to become secured within the T-shaped groove of the table. Thus, a workpiece can be affixed directly to the table by placing it between the worktable surface and the nut of the T-head bolt and drawing the nut tight against the workpiece itself.

Furthermore, a workpiece can be indirectly fastened to a worktable using T-head bolts by placing one of a variety of clamps between the nut and worktable surface, the workpiece in turn secured within the clamp. A common embodiment of such a clamp is comprised of a fixed jaw that cooperates with a separate jaw moving under the influence of a threaded screw.

Use of a workpiece clamp allows the operator to change a given workpiece by removing the workpiece from the clamp itself while allowing the clamp to remain secured to the worktable via the T-head bolts.

However, several disadvantages exist with the aforementioned methods for securing workpieces. Use of T-head bolts to directly secure a workpiece to a worktable is often cumbersome and imprecise. One must loosen or remove one or more nuts of one or more T-head bolt when changing workpieces to be machined.

Albeit, when changing workpieces, an operator can avoid the cumbersome adjustment of T-head bolts by utilizing a clamp to secure the workpiece to the worktable, many prior art clamps limit the operator to securing only one workpiece to the table at a time.

Furthermore, modern computer-numerically-controlled (CNC) machine tools involve complex "set-up" work that requires a precise placement of the workpiece onto a worktable. This placement thereafter enables the operator to enter the exact positional coordinates of the workpiece into the machine's computer program.

Because such set-up work is time consuming, CNC machine operators desire that it not be repeated when replacing identical workpieces to be machined. The aforementioned methods of securing workpieces often require an operator to perform repeated set-up work when replacing workpieces one-after-another.

To avoid the repeated set-up work required of workpiece replacement, "pallets" have been developed to secure a plurality of workpieces to a worktable during a machining process. A typical pallet is made to hold a plurality of workpieces of a given dimension. One embodiment of such a pallet is comprised of a plate having a grid of bores or apertures therethrough, with each bore adapted to accept the precise insertion of a workpiece therein.

The workpieces may be secured to the pallet using a number of different methods, depending on the type of machining process to be performed on the workpieces. Where the machining forces exerted on the workpieces are light, the workpiece can be secured to the pallet by merely using the frictional forces present with a simple insertion of the workpiece end into the pallet bore. Heavier machining processes, by contrast, may require that the workpieces be threadedly inserted into the bores.

The pallet holding a plurality of workpieces may be secured to a worktable using the aforementioned T-head bolts. Once the pallet holding a plurality of workpieces is secured to the machine, the operator programs the location of each workpiece into the computer program of the CNC machine. The machine then performs the requisite machining process on each workpiece held in the pallet.

When the machining process is completed on each workpiece and the operator wants to replace the machined workpiece with identical feed-stock, the operator can merely replace each workpiece on the pallet while the pallet remains affixed to the worktable. Such replacement thus eliminates costly set-up time because it allows the operator to utilize the previously loaded location data within the CNC program of the previously machined workpieces.

Although pallets have helped computer-aided machine operators reduce the set-up time required for a given machining process, several disadvantages continue to exist with prior art pallets. One disadvantage present in the prior art is that a given pallet is "custom-made" to hold a plurality of workpieces of only a given dimension.

For example, a pallet made to hold a plurality of workpieces, each having a ¼" outside diameter, cannot hold a plurality of ½" diameter workpieces. Because a typical prior-art pallet is not adjustable to accept a variety of workpiece sizes, a machine operator must have a separate pallet for every size of workpiece to be machined.

Another disadvantage present in prior art pallets exists with regard to how the pallet secures the plurality of workpieces therein. Some pallets require a force fit or threaded connection between each individual workpiece and the pallet. The process of securing each individual workpiece to the pallet in such pallets is undesirably time-consuming.

Other pallets, though not requiring an operator to individually secure each workpiece to the pallet, "sandwich" a series of workpieces between opposing "clamping bars," thereby securing them to the pallet. However, because the methods used to exert the opposing forces on the clamping bars are imprecise, the pallet may subject the workpieces to undue forces in the clamping process, thus risking unintentional deformation of the workpieces.

SUMMARY OF THE INVENTION

The present invention provides a novel and improved pallet which reduces the foregoing disadvantages associated with the prior art and provides advantages in construction, mode of operation, and use.

To achieve the foregoing, the present pallet includes a planar base having a horizontal orientation. Three plates are disposed on the base in generally parallel relationship to one another. Each plate has an array of apertures therein defining a predetermined grid pattern of openings, which grid patterns correspond to one another.

A pair of plates are secured to one another for sliding movement on the base. The third plate is slidable with respect to the pair of plates. A drive screw assembly is operatively connected to the plates for moving the pair of plates with respect to the third plate in one direction so as to align the apertures in the three plates to define through openings for receiving workpieces, and to move the pair of plates in an opposite direction with respect to the third plate to move the apertures out of registry, thus exerting forces on the workpieces so as to secure the workpiece in the through openings.

The three plates are disposed one above the other, with the middle plate slidable between the two affixed plates, that is, the top plate, and the bottom plate. A workpiece can be inserted into one of the through holes existing through all three plates when the apertures in the three plates are aligned on a common axis and are in registry. Rotation of the drive screw assembly moves the middle plate in a direction opposite that of the top and bottom plates, thus exerting forces on the workpiece and securing the workpiece within the pallet.

BRIEF DESCRIPTION OF THE DRAWINGS

There is shown in the attached drawing a presently preferred embodiment of the present invention, wherein like numerals in the various views refer to like elements, and wherein, FIG. 1 is a perspective view of the pallet in accordance with a preferred embodiment of the present invention;

FIG. 2 is an exploded view of the pallet in accordance with the preferred embodiment of the invention;

FIG. 5 is a detail sectional view of a screw-block assembly of the pallet in accordance with the preferred embodiment of the invention, taken generally along the line 5—5 of FIG. 1; and FIG. 6 is a detail sectional view of a screw-block assembly of the pallet in accordance with the preferred embodiment of the invention, taken generally along the line 6—6 of FIG. 1.

DESCRIPTION OF THE PREFERRED EMBODIMENT

Figure 3:
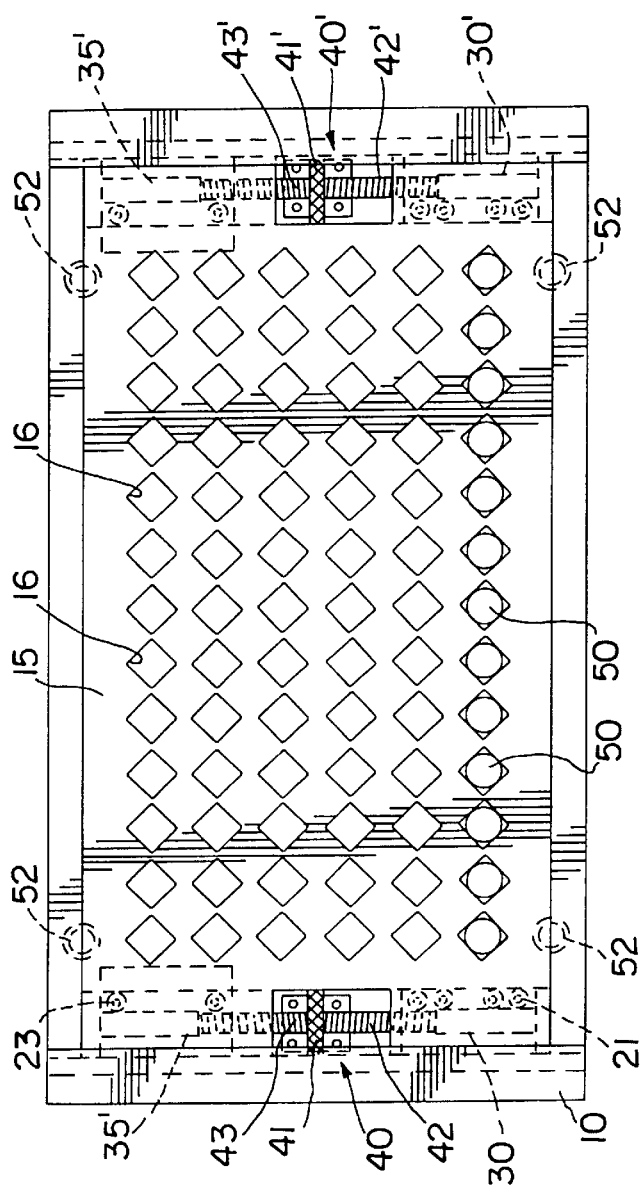
FIG. 3 is a plan view of the pallet in accordance with the preferred embodiment of the invention.

The invention disclosed herein is, of course, susceptible of embodiment in many different forms. Shown in the drawing and described hereinbelow in detail is a preferred embodiment of the invention. It is to be understood, however, that the present disclosure is an exemplification of the principles of the invention and the invention is not limited to the illustrated embodiment.

For ease of description, a pallet embodying the present invention is described hereinbelow in its usual assembled position as shown in the accompanying drawing, and terms such as upper, lower, horizontal, longitudinal, etc., may be used herein with reference to this usual position. However, the pallet may be manufactured, transported, sold, or used in orientations other than that described and shown herein.

Referring to FIGS. 1 and 2, an adjustable pallet 4 embodying the present invention is essentially comprised of a horizontally disposed, generally rectangular base plate 5 having first and second guides 10, 10' affixed in apposition to the ends of the base plate 5 by suitable fasteners 26, 26', for example machine screws. The base plate 5, together with the first and second guides 10, 10', thus form a rigid base 12 having a front open end and a back open end. The base 12 supports the other parts of the pallet and may be fastened to the work table of a machining tool (not shown) using nuts and bolts or some other method commonly used within the machining industry.

Referring to FIG. 2, it will be seen that the base 12 supports three horizontally aligned, side-by-side plates: a top tool receiving plate 15; a middle plate 20; and a bottom plate 25. Upon further inspection of FIG. 2, it will be apparent that each of these three plates contains an array of openings or apertures 16, 17, 18, respectively, arranged in a predetermined grid pattern. The grid patterns on each plate correspond to one another. The spatial relationship and size of the openings in each plate are such that the openings of the three plates are positionable in registry or vertical alignment, thus defining a plurality of uniform, through openings through the three plates.

Figure 4:
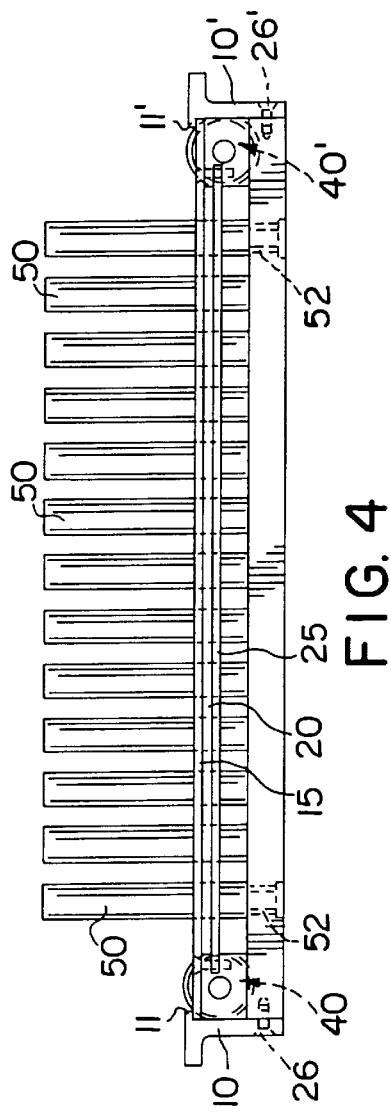
FIG. 4 is an elevation of the front of the pallet in accordance with the preferred embodiment of the invention.

As seen in FIGS. 3 and 4, locating bushings 52 are provided on the base 5 to properly orient the three plates 15, 20, 25 on the base.

The top tool receiving plate 15, the middle plate 20, and the bottom plate 25 are disposed in parallel relationship with respect to one another and the base 12 between the first and second guides 10, 10' of the base 12. The three plates are connected to the guides 10, 10' in such a manner as to allow the plates to slide with respect to one another between the guides 10, 10'.

As noted in FIGS. 4, 5 and 6, the sliding plates 15, 20, 25 described above remain slidably held within the base 12 by lips 31, 31' of the first and second guides 10, 10', respectively. Because the bottom surface of the respective lips 11, 11' of first and second guides 10, 10' are juxtaposed against the top surface of the top receiving plate 15, the stepped blocks 35, 35' and spacer blocks 30, 30' remain slidably mounted against the base plate 5.

In the preferred embodiment of the invention, the middle plate 20, which is positioned between the top receiving plate 15 and the bottom plate 25, slides in a direction opposite that of the top receiving plate 15 and bottom plate 25. The movement of the middle plate 20, in opposition to the movement of the top receiving plate 15 and the bottom plate 25, enables the combination of plates to secure a workpiece inserted into one of the through holes created by the alignment of the openings 16, 17, 18 in the three plates.

The opposing movement of the top and bottom plates 15, 25 and the middle plate 20, respectively, is a direct result of the manner in which the plates are connected to one another. Referring to FIGS. 2 and 6, the top receiving plate 15 and the bottom plate 25 are each fixedly attached in a spaced relationship to one another via spacer blocks 30,30' located proximate to the front open end of the base 12.

Referring to FIGS. 2 and 6, it will be apparent that the top plate 15 is fixedly attached to the top surface of spacer block 30 by a suitable fastener 21, for example, a machine screw, while the bottom plate 25 is fixedly attached within the respective spaces 31, 31' of spacer blocks 30, 30'. In the present embodiment of the invention, the distance between the bottom surface of the top receiving plate 15 and the top surface of the bottom 25, as defined by spacer blocks 30, 30', is sufficient to accept placement of the middle plate 20 therebetween.

Referring to FIGS. 2 and 5, one will note that the top plate 15 and the bottom plate 25 are each slidably attached to stepped blocks 35,35' located proximal to the back open end of the base 12. Again, the top receiving plate 15 and the bottom plate 25 are in a spaced relationship from one another. Middle plate 20 is attached to stepped blocks 35, 35' by suitable fasteners 23, for example, machine screws, at the back open end of the base 12 and is located directly between the top receiving plate 15 and the bottom plate 25.

From FIGS. 2 and 5, it will be seen that spacer block 30 is slidably mounted to the base plate 5 and first guide 10, proximal to the front end of the base 12. Similarly, spacer block 30' is slidably mounted to the base plate 5 and second guide 10', again proximal to the front end of the base 12.

FIGS. 2 and 6 show that stepped block 35 is slidably mounted to the base plate 5 and first guide 10, proximal to the back end of the base 12. Similarly, stepped block 35' is slidably mounted to the base plate 5 and second guide 10', again proximal to the back end of the base 12.

Referring to FIGS. 2 and 3, spacer block 30 and stepped block 35 are adjustable connected to one another via first thumb-nut assembly 40. First thumb-nut assembly 40 is comprised of a thumb-nut or drive nut 41 having threaded shafts 42,43 extending from opposite sides of the thumb nut 41. One threaded shaft 42 of the assembly 40 has a right-hand thread configuration while the other threaded shaft 43 of the thumb-nut assembly 40 has a left-hand thread configuration.

It will be noted in FIG. 2 that spacer block 30 has a longitudinal left-hand threaded socket located therein while stepped block 35 has a longitudinal right-hand threaded socket located therein. It will be further noted that the left-hand threaded socket of spacer block 30 is threadedly attached to the left-hand threaded shaft 42 of the first thumb-nut assembly 40 while the right-hand threaded socket of the stepped-block 35 is threadedly attached to the right-hand threaded shaft 43 of the first thumb-nut assembly 40.

Similarly, referring to FIGS. 2 and 3 again, spacer block 30' and stepped block 35' are adjustably connected to one another via second thumb-nut assembly 40'. Second thumb-nut assembly 40' is comprised of a thumb-nut 41' having threaded shafts 42', 43' extending from opposite sides of the thumb-nut 41'. One threaded shaft 43' of the assembly 40' has a right-hand thread configuration while the other threaded shaft 42' of the assembly 40' has a left-hand thread configuration.

It will be noted in FIG. 2 that spacer block 30' has a longitudinal left-hand threaded socket located therein while stepped block 35' has a longitudinal right-hand threaded socket located therein. It will be further noted that the left-hand threaded socket of spacer block 30' is threadedly attached to the left-hand threaded shaft 42' of the second thumb-nut assembly 40' while the right-hand threaded socket of the stepped block 35' is threadably attached to the right-hand threaded shaft 43' of the second thumb-nut assembly 40'.

Because spacer blocks 30,30' are threadably attached to stepped blocks 35, 35' via thread-nut assemblies 40, 40', respectively, rotation of thread-nut assemblies 40, 40' in the same direction cause the spacer blocks 30, 30' to move in a direction opposite that of the stepped blocks 35,35'.

Because the top receiving plate 15 and bottom plate 25 are fixedly attached to the spacer blocks 30, 30' while the middle plate 20 is fixedly attached to the stepped blocks 35, 35', a simultaneous rotation of first and second threaded nut assemblies 40, 40' will cause the top receiving plate 15 and bottom plate 25 to together slide in a direction opposite that of the middle plate 20, located therebetween.

Having observed the details of the adjustably movable plates, attention may now be given to the apertures located in each plate. As illustrated in FIG. 2, each of the three plates has an array of apertures therein that are arranged in rows longitudinally and transversely on the plates to define a predetermined grid pattern on each plate. In the present embodiment of the invention, each aperture 16, 17, 18 in a given plate is both equal in dimension to one another and equidistant from one another with regard to placement on the plate. The grid patterns on each plate 16, 17, 18 correspond to one another.

Furthermore, the size and placement of apertures on a given plate are equal on each of the three plates of the pallet. With this in mind, it is important to note that the top receiving plate 15 and bottom plate 25 are attached to one another, via the spacer blocks 30, 30', such that the apertures 16, 18 of both plates 15, 25 are in registry or in alignment. Because the middle plate 20 is adjustably movable between the top receiving plate 15 and the bottom plate 25, the apertures 17 therein are positionable between the two plates 15, 25 to allow the axes of the apertures 16, 17, 18 of the three plates to be in registry or alignment for receiving a tool therein.

When the apertures 16, 17, 18 of the three plates are in registry, the apertures define a through opening through the three plates. As illustrated in FIGS. 3 and 4, the given aligned apertures in each plate that define the through opening of the three plates in registry are of a size and shape to accept the insertion of a given elongated work-piece 50 therethrough.

If an elongated workpiece 50 is inserted into one of the through openings existing through the three plates 15,20,25 in registry, an adjustment of the thumb-nut assemblies 40, 40' causes the aforementioned opposing sliding movement of the middle plate 20 with respect to the connected top and bottom plates 15, 25, which thus causes the apertures 16 in the top receiving plate 15 and the bottom plate 25 to together slide out of registry with the apertures 17 of the middle plate 20.

When the apertures 16 in the middle plate 20 are moved out of registry with those of the top receiving plate 15 and the bottom plate 25, with a workpiece inserted therethrough, the inside walls of the apertures 16 and 18 of top and bottom plates 15 and 25 become lodged against the outside wall of the workpiece while the opposite inside walls of the apertures 17 of the middle plate 20 become lodged against the opposite outside wall of the workpiece 50. The resulting opposing forces of the aperture walls of the three plates acting on the workpiece thus secure the workpiece within the pallet 4.

In the present embodiment of the invention, the apertures in each plate have a square shape, with the opposite corners of the square aligned parallel to the direction of slide of the plates. This configuration proves beneficial for securing cylindrically shaped workpieces such as drill bits therein because, regardless of the diameter of a cylindrical workpiece, the outer diameter of the workpiece automatically aligns itself within the corner of a given square when the corners of the square apertures are adjustably moved against the workpiece.

Also, a given square cross-section aperture can accept various diameters of cylindrical shaped workpieces, so long as the workpiece diameter is of a dimension to fit within the square. Thus, an adjustable pallet 4 using square cross section apertures can accept various diameters of workpieces without requiring pallet replacement. For example, a pallet having a grid of square shape apertures of equal dimension can accommodate a plurality of cylindrical workpieces of given equal diameter during one use of the pallet, with the same pallet accommodating a subsequent plurality of cylindrical workpieces, each of equal diameter and different from that of the prior use.

In operation, the adjustable pallet 4 is secured to the work-table of a machine tool using methods commonly employed in the machining industry. An operator adjusts the thumb-nut assemblies 40, 40' of the pallet 4 to bring the apertures of the three plates 15,20,25 into registry. With the apertures 16,17,18 in registry, the operator can place one or more elongated workpiece into available through openings in the pallet 4.

In the present embodiment of the invention, because each of the apertures within the pallet 4 are of the same size, it is preferred that each of the elongated workpieces be equal to one another with regard to outer diameter. After the operator inserts the desired number of workpieces into the respective penetrations,of the pallet, the operator once again rotates the thumb-nut assemblies 40, 40' to move the aperture 17 out of registry with the apertures 16 and 18, thus securing the workpieces 50 within the pallet 4 in position to be machined.

Persons skilled in the art will recognize that the apertures 16, 17, 18 may take shapes other than square, for example, circular apertures of like number as the square apertures, arranged in a grid. Movement of the thumb-nuts 40, 41' in one direction will permit vertical alignment of the selected apertures in the three plates, to enable loading of a workpiece into the through opening defined by the aligned apertures. One or more workpieces can be positioned in the adjustable pallet 4. When the thumb-nuts 40, 40' are moved in the opposite direction, the middle plate 20 will be displaced with respect to the top plate 15 and the bottom plate 25 and the apertures 17 will be moved out of alignment with the apertures 16 and 18 to lock or secure the workpieces 50 in upright position on the pallet 4.

Further, the top plate 15 and the bottom plate 25 can be fixed together in offset relationship to position the workpieces in an offset or angled relationship to the base 5. For example, if the axis through the apertures 16 and 18 makes an angle of 25 degrees with the base, the longitudinal axis through the workpieces positioned in the through opening will be at an angle of 25 degrees with respect to the base 5. The middle plate 20 is slidably movable between the top plate 15 and the bottom plate 25 to move the apertures 17 therein out of alignment with the apertures 16 and 18 to secure the workpieces in the through openings in which they are positioned.

With the workpieces secured within the pallet, the operator is free to then perform the desired machining process on the workpieces. Upon completion of the machining process, the operator removes the workpieces and repeats the aforementioned procedure.

The foregoing description and the accompanying drawing are illustrative of the present invention. Still other variations and arrangements of parts are possible without departing from the spirit and scope of the following claims.

We claim:

1. A pallet for presenting elongated workpieces to be machined and comprising:

a base;

a first substantially planar receiving plate slidably carried on the base in a spaced relationship therefrom and being substantially parallel thereto, said first substantially planar receiving plate having an array of apertures arranged in a predetermined pattern;

a second substantially planar plate disposed adjacent to the first substantially planar receiving plate and slidably mounted on the base, said second substantially planar plate having an array of apertures arranged in a predetermined pattern;

a third substantially planar plate disposed adjacent to the second substantially planar plate and slidably mounted on the base, said third substantially planar plate having an array of apertures arranged in a predetermined pattern;

said predetermined patterns of apertures in each said plate corresponding to one another;

a drive screw assembly coacting with said three plates for moving said three plates and the patterns of apertures defined therein into registry to form through openings through the three plates for receiving a workpiece in one or more through openings and then moving said three plates in order to move the apertures out of registry and secure said workpieces in the pallet.

2. A pallet as in claim 1 wherein the first plate and the third plate are connected to one another and are slidable with respect to the second plate.

3. A pallet as in claim 2 wherein the second plate is disposed between the first plate and the third plate.

4. A pallet as in claim 3 wherein the drive screw assembly includes a thumb nut and threaded shafts of opposite thread hand extending therefrom, the first and third plates being secured to a spacer block slidable on the base, and the second plate being secured to a stepped block slidable on the base, one threaded shaft of the drive screw assembly being connected in a threaded socket in the spacer block and the other threaded shaft of the drive screw assembly being connected in a threaded socket in the stepped block, whereby rotation of the thumb nut in one direction will move the apertures in the second plate into alignment with the apertures in the first and third plates to form the through openings for receiving workpieces and rotation of the thumb nut in the opposite direction will move the apertures in the second plate out of registry relative to the apertures in the first and third plates to secure the workpieces in the pallet.

5. A pallet as in claim 4 wherein guides are secured at each end of the base, said guides having lips formed at the ends remote from the base for engaging the first plate and retaining the three plates on the base.

6. A pallet as in claim 1 wherein the apertures in the three plates are each square in cross section and the predetermined patterns in each plate are in the nature of a grid with the apertures arranged in rows extending both longitudinally and transversely on each of the three plates.

7. A pallet as in claim 6 wherein the axis of each aperture is substantially perpendicular to the plane of the plate in which the aperture is formed, and the three plates are arranged substantially parallel to the base, whereby the axis of a through opening when the three plates are in registry will be perpendicular to the base and the axis of each workpiece retained in the through openings in the pallet will be perpendicular to the base.

8. A pallet for presenting elongated workpieces to be machined and comprising:

a base;

a first substantially planar receiving plate slidably carried on the base in a spaced relationship therefrom and being substantially parallel thereto, said first substantially planar receiving plate having an array of apertures arranged in a predetermined pattern;

a second substantially planar plate disposed adjacent to the first substantially planar receiving plate and slidably mounted on the base, said second substantially planar plate having an array of apertures arranged in a predetermined pattern;

a third substantially planar plate disposed adjacent to the second substantially planar plate and slidably mounted on the base, said third substantially planar plate being secured to said first substantially planar plate, said third substantially planar plate having an array of apertures arranged in a predetermined pattern;

said predetermined patterns of apertures in each said plate corresponding to one another;

a drive screw assembly coacting with said three plates for moving said first and third plates and the second plate respectively, in opposite directions, movement in one direction causing the arrays of apertures to move into registry to form through openings through the three plates for receiving a workpiece in one or more through openings and movement in the opposite direction causing the apertures to move out of registry and secure said workpieces in the pallet.

9. A pallet as in claim 8 including a drive screw assembly at each side of the base coacting with said three plates.

* * * * *